Mar. 6, 1923.
J. M. W. KITCHEN.
POULTRY PLANT CONSTRUCTION.
FILED MAY 1, 1919.
1,447,476.
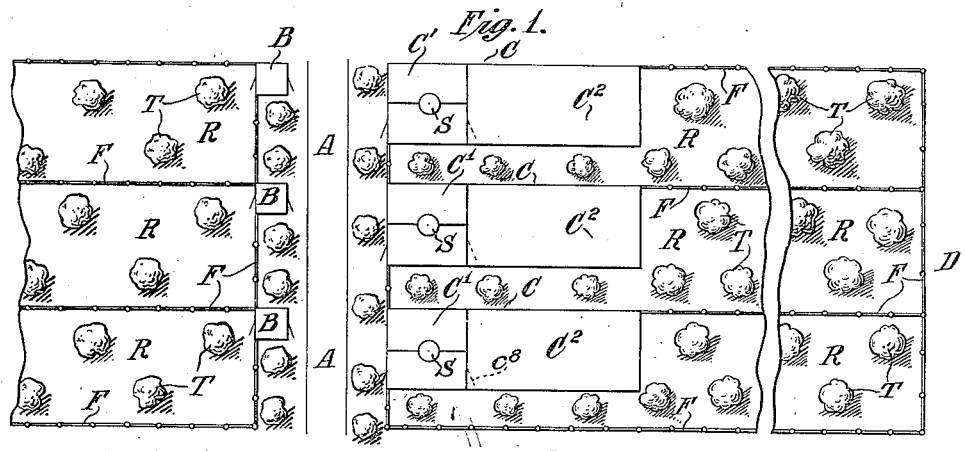
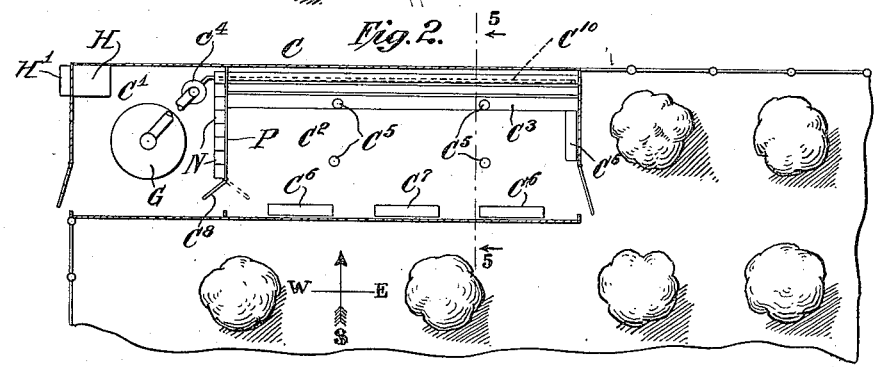
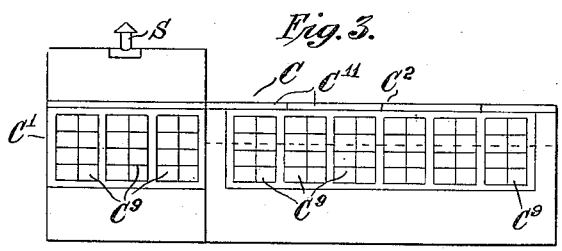
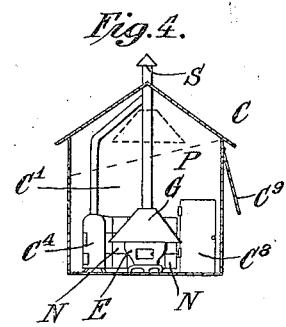
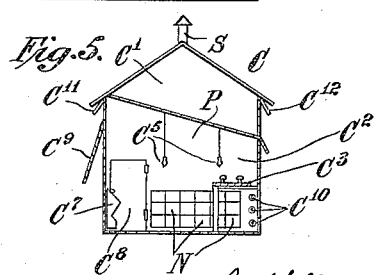
INVENTOR
Joseph Moses Ward Kitchen.

Patented Mar. 6, 1923.

1,447,476

UNITED STATES PATENT OFFICE.

JOSEPH MOSES WARD KITCHEN, OF EAST ORANGE, NEW JERSEY.

POULTRY-PLANT CONSTRUCTION.

Application filed May 1, 1919. Serial No. 293,929.

*To all whom it may concern:*

Be it known that I, JOSEPH MOSES WARD KITCHEN, a citizen of the United States, residing in the city of East Orange, county of Essex, and State of New Jersey, have invented Improvements in Poultry-Plant Constructions, of which the following is a specification.

The objects of this invention are: securing convenience and economy in carrying out breeding operations in poultry husbandry, securing a high egg production during those times of the year when the production of eggs is usually lessened, securing highest degree of constitutional strength in the poultry produced, securing greater certainty in keeping isolated those individuals that have had developed high egg laying powers and in carrying out a practical plan for producing the largest amount of eggs and poultry meat at the least expense.

First describing a poultry plant embodying the invention, I will describe its operation, and then in my claims further make clear the inventive ideas involved. In the accompanying drawings, Fig. 1 represents a plan view of part of a poultry plant. Fig. 2 represents a plan view of a combined brooder, laying and trapnest house and fruit-tree shaded, fenced poultry run. Fig. 3 represents an elevational view of the front of the house. Fig. 4 represents a sectional elevation of the brooder end of the house looking towards a partition dividing the house into two apartments. And Fig. 5 represents a sectional elevation of the laying apartment of the house taken on the line 5—5, Fig. 2. Attention is drawn to the fact that the occupants of each house of the plant are isolated by fencing from the occupants of the other houses, that each house is well spaced from every other house, and that the run of every house is of large size. This arrangement secures a high degree of health in the denizens of the plant. The arrangement further secures great convenience and economy of time in operating the plant. The character T represents shade trees in the runs R. R. R. and in the wagon lane A. B. B. B. are isolated breeding houses. C. C. C. are the combined brooder, laying and trapnest houses which have front walls facing southerly. The breeding and combined houses are located on opposite sides of the wagon lane A, one of each type being in the same line and representing a cooperative breeding unit; selected individuals of quality as proved by trapnest testing, being transferred to its related breeding house in line with its related trapnest house directly across the wagon lane A. In no case is the size of the laying apartment of the houses so large as is customary in the largest size of laying houses. The arranged location of each house secures economy of management as a whole, yet superior hygienic advantages by a lesser crowding of individual occupants of the plant. The risk from fire is also lessened.

In each house C. there are two apartments. One $C^1$, is probably about 12 by 20 feet in size. In it is the brooder heater E, with its brooder hood G. This heater E and the auxiliary hot water heater $C^4$ are connected with the hooded smoke funnel S. H is a coal bin. The other apartment $C^2$ is preferably 20 to 25 feet long by 20 feet deep. The partition P, divides the two apartments. It has the double swinging door $C^8$, and as many trapnests as will meet the needs of the laying occupants of the apartment $C^2$. The laying apartment has the dropping board $C^3$, which has its rear edge spaced from the rear wall of the house C. The hot water pipes $C^{10}$ heated by the heater $C^4$ are located on the rear wall of the laying apartment at a lower level than the dropping board. Under natural law, fresh air enters at the bottom of the sashes $C^9$ and is inductively drawn under the dropping board by being heated, and rises to a level above the board and passes forward and out thru the ventilator $C^{11}$. It will be noted that with this arrangement, fresh air does not pass over and in immediate contact with the droppings of the roosting fowls in a travel from the front to the rear of the dropping board as is the usual case. Hence not only does my method as here described conduce through warmth to the comfort of the roosting fowls at night, but also supplies them with purer air to breathe. It will be seen that this heating provision is also useful in warming the air of apartment C² when it is used as a run for young chicks. In this case the space back of the dropping board is more or less closed. Then the space under the dropping board acts as a hover. The heating apparatus being of the hot water type, provides for a very accurate temperature regulation of the apartment C². The daylight openings at the front of the house are fitted with sashes C⁹ that are hung by hinges at the top. They swing outward. This arrangement enables any desired amount of air to enter the house and yet prevents the entrance of rain. In summer the inside of the sashes are coated with limewash, which keeps the house more cool. In the fall this coat of lime is easily brushed off when it is desired to have direct southerly sunlight enter the house. The board shutters C¹¹ and C¹² at the front and the rear of the house which also are hinged at the top, can be opened when required for ventilating purposes.

The roof of the apartment C² is single pitched, sloping downward from the southerly front to the rear of the house; but the roof of the brooding apartment C¹ is two pitched, and sufficiently elevated so that the brooder hood G can be raised to a level higher than the head of the poultryman attendant when standing erect, and there retained. When the apartment C¹ is not being used for brooding chicks, the hood G is stored in the peaked cavity underneath the double pitched roof.

The apartment C¹ is sufficiently large to install an incubator. Hence it can be used for purposes of incubation and brooding as well as for a temporary feeding pen for layers who pass thru the trap nests N. When thus used and the occupants have dropped their eggs, the layers can immediately go to work in the apartment C¹, scratching for food, thus gaining exercise.

C⁶ and C⁷ are feed and water holding devices, and C⁵ C⁵ are electric bulbs pertaining to the daylight prolonging lighting system that may be used in increasing egg production during the short days of fall and winter.

The operation of these features of the invention is as follows:

The heating of the laying apartment C² by the heating pipe coils C¹⁰ secures an earlier good hatchability of the eggs laid; and hence an earlier incubating season becomes possible, and this secures an earlier laying by the pullets in the fall. The idea is to secure an early fall and winter laying of most of the eggs, and an early spring market for poultry meat, at which times prices are relatively the highest. The eggs being hatched, the chicks are brooded in the apartment C¹ in the usual way. The apartment C² is used as a run for the chicks, and it is kept at a lower temperature. Being wire netted as to its air openings as is commonly the case, the chicks are protected from hawks and other enemies. When sufficiently grown they are given the larger range of the fence enclosed and tree shaded runs R. R. which enclosures are seeded with oats and rape in the early spring. Later in the summer and fall, green food, like rape and kale, which has been growing on the open ground D and cultivated in rows by horse power, is thrown over the fence at the end of the runs R. Fowl love this green food and when called, they run for it and greedily devour it. This provision naturally helps to retain a sanitary condition of the surface of the run R close to the houses C by decreasing the amount of the droppings near to the houses. When the fowl are sufficiently matured, the cockerels are separated from the pullets and moved to a separate enclosure containing a cheaper house shelter, and the pullets have the entire use of the houses C. C. Late in the winter selected pullets that have shown the best trap-nest records are moved to the breeding houses B. B. that is in the line of the houses C. C. In this way the identity of the individual trap-nest pullets and male birds from individual houses, is more conveniently conserved and utilized for future breeding purposes. The run of each breeding house B is of a large area. With this arrangement of isolated houses and large runs, a beneficial effect on the constitutional strength of the breeding stock is effected.

The trapnests in the partition P are of known construction such as that disclosed in patent to Kroeh, No. 1,621,875, April 2d, 1912, which is a convenient type to use when the attendant cannot give frequent prompt release to a trapped hen. I may use any known type of trap nest, either of a type that has only one entrance, and exits the hen back into the laying apartment, or one of a type in which the hen is automatically released from the nest into the apartment C'; or that is released by the poultry man. In any case the apartment C' acts advantageously in allowing the hen that has laid an egg to be given special and immediate feeding as well as exercise in scratching for scratch-food. It will be noted that by providing only for a limited number of layers in the apartment C² the laying accommodations for all the layers are provided for in the dividing partition P. In large poultry plants in which trap nesting is practiced, it may be convenient to have a poultry-house of considerable length, but as a rule it is better under most conditions to limit the size of an egg-laying apartment to 20 lineal feet—a larger house being divided by partitions into 20-feet subdivisions to aid in preventing spread of contagious diseases such as roup and chicken-pox. In such case, in operating the trap-nests in connection with any partition, the trapped hen is after laying released by the attendant and into the apartment from which she entered the nest.

This arrangement calls for a lesser amount of building material and secures greater economy of travel and convenience in operation than if the brooder house and laying and trapnesting premises are in separated structures. Attention is called to the electric lighting of the plant. A plurality of conducting wires are run from a convenient switching central point such as the poultry man's place of residence, to each house, and each conducting wire is connected with its special light bulbs. By artificially lighting the laying houses in the beginning and ends of the night, a longer time for securing food is afforded, and a greater production of eggs assured. Subject matter is herein disclosed that is claimed in my copending application Ser. No. 355,616, filed Feb. 2, 1920.

What I claim as new is:

1. In a poultry house, having a rectangular floor plan, a front wall facing the south, and a rear wall; the combination of a single pitched roof sloping downward from the front wall to the rear wall, a horizontally arranged dropping board near to but spaced from the rear wall, roosts over the dropping board horizontally arranged at one level and plane, a row of light transmitting sashes in the front wall and extending between the ends of the front of the house, said sashes being hinged at the top and operatively swinging outward from the front wall at the bottom and capable of excluding rain from the house when the sashes are opened, means in the front wall at a level above the sashes for controlling the exit of effete warm air from and preventing the entrance of rain into the house, said combination comprising means for securing a travel of fresh air into the house continuously along the front of the house at the level of the bottom of the sashes, from the front of the house, under the dropping board to the rear wall, upwardly along the rear wall to a level above the dropping board and then forward over the fowls roosting over the dropping board, upwardly to the sloping roof and out of the breathed air exit for the outgo of effete warm air in the front wall of the house at a level above the sashes.

2. In a poultry house comprising roosts horizontally disposed in one plane over a horizontally disposed dropping board, said dropping board, means for securing the entrance of fresh air from the front of the house, means for inducing a current of and warming said air under and to the rear of the dropping board and upwardly at the rear of said board at the rear wall of the house and forward over the dropping board to and out of the front of the house, said means comprising provision for admitting light to the house and for preventing entrance of rain into the house.

3. A poultry house having a rear wall, said house containing a dropping board, said board having its rear edge spaced from the rear wall, a heating coil of piping located approximate to the rear wall and under the space, and a heating device connected with the coil.

4. In a poultry house, two connecting apartments, one apartment containing a heated brooder and a hot-water boiler, the other apartment containing hot-water pipes connecting with said boiler, said pipes being placed close to the rear wall of the house at a level below a dropping board, said second-named apartment comprising said dropping board, said board being spaced from the rear wall, and allowing warmed air to pass upwardly to the rear of the dropping board.

5. In a combined brooder, laying and trap-nest house, a brooder apartment and a laying apartment, said apartments being separated by a partition containing trap-nests communicating with said apartments, a swinging door providing for the passing of an attending poultryman from one apartment to the other apartment, and means for artificially heating both apartments, said means comprising a heater in the brooder apartment and hot-water pipes running from the heater thru the entire length of the laying apartment.

6. In a poultry house, having a rectangular elongated floor plan and a front wall facing southerly, adjustably operable ventilating means in the front and rear walls of the house at a high level of said walls immediately adjacent to the front and rear plates of said walls, and a row of light admitting sashes in the front wall at a lower level than the high level ventilating means, said named means being all hung from the top of said means by hinges and swinging outward from said walls, said means securing effective travel of fresh air, but coincidently excluding rain from the house, said house comprising a brooder and feeding apartment, a laying apartment and a partition dividing said apartments, said row of light-admitting sashes running horizontally and at substantially on the same level in both apartments.

7. In a poultry house comprising a rear wall, a front wall facing southerly and a horizontally disposed dropping board, an air space between the dropping board and the rear wall at the level of the dropping board, air admitting openings in the front wall, and heating pipes at a level below the dropping board and under the air space between the dropping board and the rear wall.

8. In a poultry house, comprising a front wall facing southerly and a horizontally disposed dropping board spaced from the rear wall of the house, means for securing the entrance of fresh air thru the front wall, means for heating the fresh air and passing the heated air upward thru said space and forwardly over said board and the fowls roosting over said board to and out of the front wall.

JOSEPH MOSES WARD KITCHEN.